W. S. GRAHAM.
REAR FURROW WHEEL LIFT.
APPLICATION FILED NOV. 29, 1920.

1,435,291.

Patented Nov. 14, 1922.

Inventor:-
William S. Graham,
By H. P. Doolied
Atty.

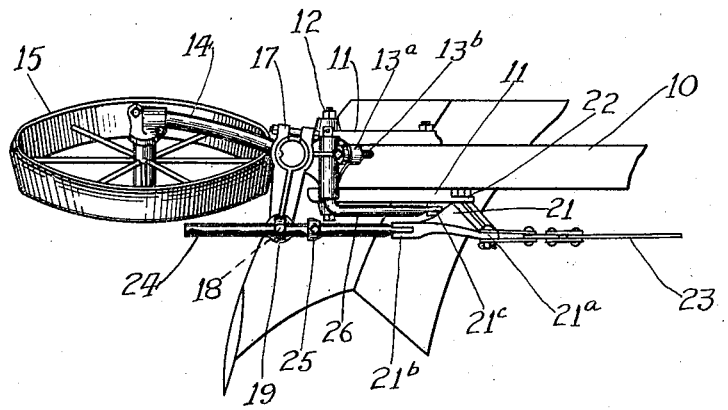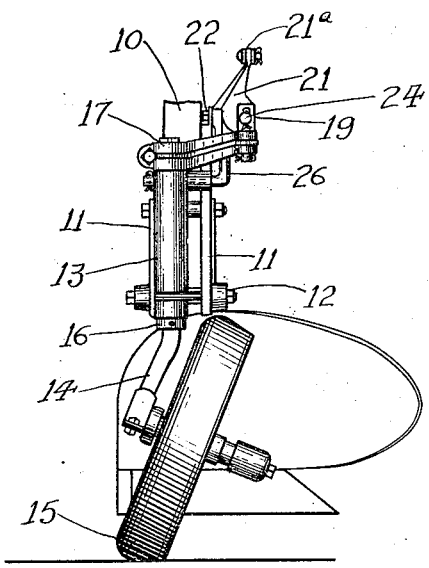

Patented Nov. 14, 1922.

1,435,291

UNITED STATES PATENT OFFICE.

WILLIAM S. GRAHAM, OF CANTON, ILLINOIS, ASSIGNOR TO INTERNATIONAL HARVESTER COMPANY, A CORPORATION OF NEW JERSEY.

REAR FURROW-WHEEL LIFT.

Application filed November 29, 1920. Serial No. 426,931.

*To all whom it may concern:*

Be it known that I, WILLIAM S. GRAHAM, a citizen of the United States, residing at Canton, in the county of Fulton and State of Illinois, have invented certain new and useful Improvements in Rear Furrow-Wheel Lifts, of which the following is a full, clear, and exact specification.

My invention relates to wheel plows of the so-called frameless type, and more specifically to means for controlling the rear furrow wheel when such a plow is raised and lowered.

The objects of my invention are to provide a rear furrow wheel lift of simplified construction, and one that will include means for controlling the castering action of the rear wheel and in which the thrust on the furrow wheel while plowing reacts on the wheel adjusting connections in such a way as to positively hold the wheel in working position where in prior devices this thrust tends to swing the wheel and raise the plow.

These objects are accomplished by swiveling the upright spindle of the rear furrow wheel in a bracket pivoted to the plow on a horizontal axis, and providing the spindle with a laterally extending arm, and by controlling both the bracket and spindle through a single locking member or lever pivoted intermediate its ends on the plow and connected to the bracket and spindle in such a way that rocking of the pivoted member swings the bracket to raise and lower the furrow wheel, and also locks and releases the spindle as the wheel is lowered and raised; these connections being so related that the working thrust is transmitted to the bracket and serves to lock it in position.

With these and other objects in view, my invention consists of the organization, details of construction, parts or their equivalents herein described, and more particularly defined in the appended claims.

Referring to the drawings—

Fig. 3 is a plan view, and,

Figure 1:
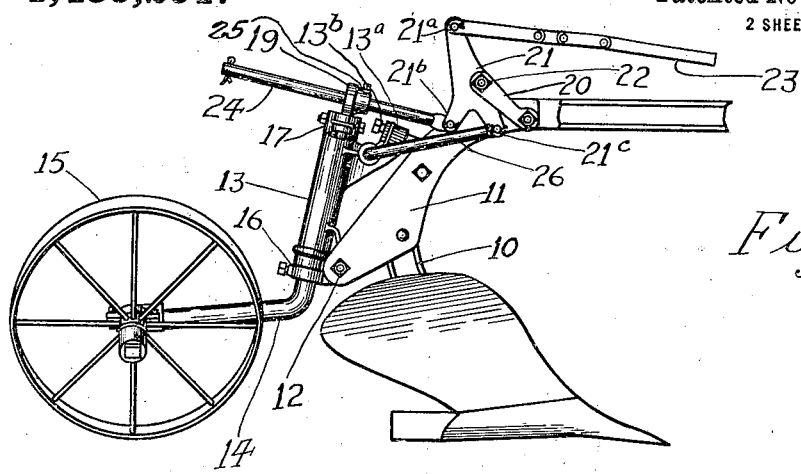
Fig. 1 is a side elevation of the rear end of a wheeled plow equipped with a furrow wheel embodying my invention and showing the furrow wheel in raised position and the plow lowered.
Figure 2:
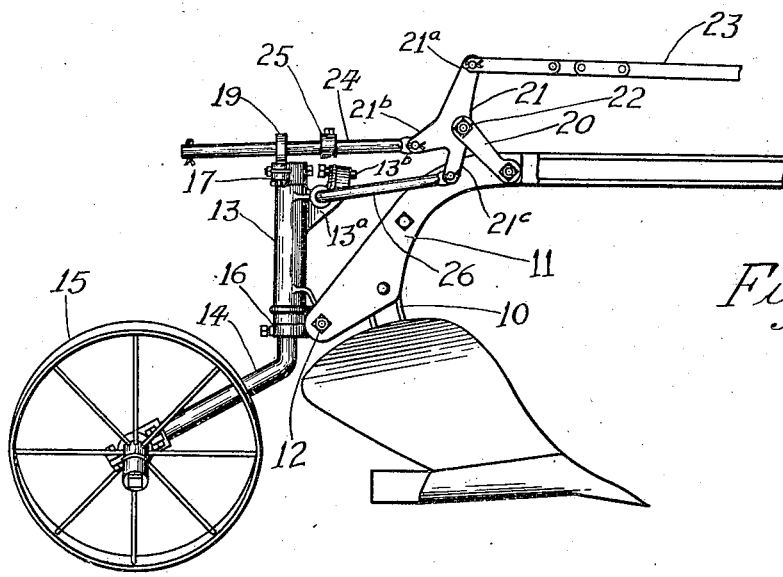
Fig. 2 is a similar view with the wheel lowered and the plow raised.

Fig. 4 a rear view of the same structure.

For purposes of illustration I show my improved rear wheel lift in connection with a plow beam 10, which may be the rear plow of a gang. The standard of the plow has secured thereto plates 11 between which is pivoted on a horizontal axis at 12 a bearing bracket or sleeve 13. In this sleeve there is journaled the upright portion of the crank spindle 14 carrying the rear furrow wheel 15 which is inclined or canted from the land side in the usual manner. The sleeve 13 is provided with an extension 13$^a$ in the end of which there is threaded a stop bolt 13$^b$, which is positioned to engage the rear of the plow standard when the plow is lowered and serves to regulate the extent of its descent. A stop collar 16 on the spindle supports the sleeve 13, and the projecting upper end of the spindle has clamped or otherwise fixed thereon the laterally extending arm 17, which has a vertically extending aperture 18 at its outer end in which is swiveled a loop member or eye 19. On the rear end of the plow beam there is mounted in the bracket 20 secured to the beam a rock arm or lever 21. This arm is pivoted to the bracket intermediate its ends on a horizontal axis at 22, and is formed to provide an upwardly extending arm 21$^a$ and is preferably forked below its pivot to provide two downwardly extending arms 21$^b$, 21$^c$. The arm 21$^a$ is connected to a flexible lifting link 23, which is connected to the lifting mechanism for the plow (not shown). The arms 21$^a$ and 21$^b$ are laterally inclined from the main part of the rock arm so that their ends are outwardly offset and brought into approximately the same vertical plane as the eye 19 on the spindle arm 17 (Fig. 4). The arm 21$^b$ has pivotally connected to it a rod 24, which is loosely received in the eye 19 and an adjustable stop collar 25 is mounted on the rod 24 in advance of the eye 19, and is in position to engage this eye when the arm 17 moves toward it as the plow is lowered. The arm 21$^c$ has connected to it a link 26, which is pivoted to the sleeve 13 near its upper end.

With the construction above described rocking of the arm 21 acts to swing the sleeve or bracket 13 through link 26, thereby raising or lowering the furrow wheel. At the same time the rod 24 is kept substantially at right angles to eye 19 and moved forwardly or rearwardly therethrough in accordance as the plow is being lowered or raised, but as its connection to member 21 is above and behind the pivot of link 26 to member 21, its longitudinal movement is less than that of link 26 and the upper end of sleeve 13, and the joint movement of rod 26 and of the upper end of sleeve 13 acts to bring the eye 19 into contact with the stop collar 25 when the plow is lowered and to move the eye 19 away from the stop when the plow is raised. It is therefore evident that the furrow wheel spindle will be locked against swiveling movement when the plow is lowered, and that it will be practically free to turn in the bearing bracket 13 when the plow is raised as the eye 19 is then free to move on rod 24 to a considerable extent, and also that pressure of the furrow wheel against the furrow side when plowing can be regulated by change in position of stop 25 and that such adjustment is independent of the adjusted depth of plowing. By having both links connected to the one rock arm the tendency of the rear furrow wheel to swing itself around and thus raise the plow out of the ground is done away with. That there is this tenedncy in devices of this type is quite apparent, since the side thrust of the ground against the wheel results in pressure of the spindle arm against its stop. This action reacts on the pivoted sleeve carrying the spindle of the rear furrow wheel which tends to swing back, and would swing back if it were not for the link connection between the sleeve and the rock arm. In my construction the pressure caused by the side thrust is carried through the rod 24, rock arm 21 and link 26 to the sleeve 13 resulting in a pull against the sleeve which causes the adjustable stop 13$^b$ to bear harder against the standard.

The construction above described exemplifies but one form which my invention may take, and modifications thereof may be made within the scope of the following claims.

I claim:

1. The combination with a plow carrying frame of a bracket pivoted to the frame on a horizontal axis, a furrow-wheel having a spindle journaled in said bracket to caster about an upwardly extending axis, a rock-arm pivoted on the frame and connected to the bracket for rocking it on its pivot, and a link connecting the rock-arm and spindle and provided with means for locking the spindle against castering when the bracket has been rocked in a direction to raise the furrow wheel.

2. The combination with a plow carrying frame of a bracket pivoted to the frame on a horizontal axis, a furrow-wheel having a spindle journaled in said bracket to caster about an upwardly extending axis, a rock-arm pivoted on the frame and connected to the bracket for rocking it on its pivot, a link pivoted to said rock-arm and slidably connected with said spindle, and means on the link for engaging the spindle to lock it against castering when the bracket has been rocked in a direction to raise the furrow wheel.

3. The combination with a plow carrying frame of a bracket pivoted to the frame on a horizontal axis, a furrow-wheel having a spindle journaled in said bracket to caster about an upwardly extending axis, a laterally extending arm on the spindle, a corresponding branch on the rock-arm, a link connected to said branch and slidably engaged with the arm on the spindle, a second link connecting the rock-arm and said bracket for rocking it on its pivot, and a stop on said first link adapted to engage the arm on the spindle when the bracket has been rocked in a direction to raise the furrow-wheel.

4. The combination with a plow carrying frame of a bracket pivoted at its lower end to the frame, a spindle journaled in said bracket on an axis transverse to that of the bracket, a crank on said spindle, a furrow wheel journaled on the crank and positioned to bear against the land side when plowing and controlling means mounted on the frame and connected to the upper ends of the bracket and spindle respectively including means through which the thrust on the furrow-wheel when plowing is transmitted to the bracket connection.

5. The combination with a plow carrying frame, of a rear furrow wheel mounted to be raised and lowered with respect to said frame and also to caster thereon, and controlling means for the movements of said furrow wheel including a stop for limiting castering of the wheel in one direction when the wheel is raised and means cooperating with the stop, through which the pressure on said stop tends to lock the wheel against downward movement.

6. The combination with a plow carrying frame of a bracket pivoted at its lower end to the frame on a horizontal axis, a spindle journaled in said bracket on an upwardly extending axis, a furrow-wheel mounted on the spindle on an axis oblique to that of the spindle whereby the furrow-wheel is positioned to bear against the land side when plowing, a rock-arm on the frame, a connection between the rock-arm and spindle including means for transmitting the thrust of the furrow-wheel when plowing to the rock-arm, and a connection between the rock-arm and the upper end of the bracket serving to transmit the thrust to the bracket in a manner to hold it against movement on its pivot while plowing.

7. The combination with a plow carrying frame of a bracket pivoted to the frame on a horizontal axis, a spindle journaled in said bracket on an upwardly extending axis and having a laterally extending arm, a furrow-wheel on the spindle, a rock-arm pivoted intermediate its ends on the frame, an operating connection at the upper end of the rock-arm, a link connected to the rock-arm below its pivot and slidably engaged with the lateral arm on the spindle and having a stop for engagement with said arm, and a second link connected to said rock-arm below the first mentioned link and connected to said bracket.

In testimony whereof I affix my signature.

WILLIAM S. GRAHAM.